United States Patent [19]

Chung et al.

[11] Patent Number: 5,060,094
[45] Date of Patent: Oct. 22, 1991

[54] CASSETTE LOADING APPARATUS FOR DIGITAL AUDIO TAPE RECORDER

[75] Inventors: Seok P. Chung; Byung C. Lim, both of Kyungki; Seung H. Yoo, Seoul, all of Rep. of Korea

[73] Assignee: Goldstar Co., Ltd., Seoul, Rep. of Korea

[21] Appl. No.: 273,412

[22] Filed: Nov. 18, 1988

[30] Foreign Application Priority Data

| Nov. 20, 1987 | [KR] | Rep. of Korea | 20107 |
| Dec. 31, 1987 | [KR] | Rep. of Korea | 24574 |
| Apr. 29, 1988 | [KR] | Rep. of Korea | 6198 |
| Apr. 29, 1988 | [KR] | Rep. of Korea | 6199 |

[51] Int. Cl.$^5$ .............................................. G11B 5/008
[52] U.S. Cl. .................................... 360/96.5; 242/199
[58] Field of Search .......................... 360/96.5, 96.6; 242/197-199

[56] References Cited

U.S. PATENT DOCUMENTS

| 4,761,697 | 8/1988 | Hashiguchi | 360/96.5 |
| 4,794,477 | 12/1988 | Hashiguchi | 360/96.5 |
| 4,800,011 | 2/1989 | Aarts | 360/96.5 |
| 4,814,911 | 3/1989 | Naoi | 360/96.5 |
| 4,858,042 | 8/1989 | Ito | 360/96.5 |

Primary Examiner—A. J. Heinz
Attorney, Agent, or Firm—Rosen, Dainow & Jacobs

[57] ABSTRACT

A cassette front loading apparatus of a digital audio tape recorders for tray type which loads and unloads a cassette by moving horizontally and vertically. A single capstan motor is used for loading and for the lifting and dropping and for moving the cassette horizontally and lifting and dropping the same, to effect the loading and unloading operation including the horizontal and vertical movement, slider opening movement, cassette take out movement and location detecting operation and the like. Consequently all of the mechanism is very much simplified whereby the preciseness and the durability are enhanced.

4 Claims, 16 Drawing Sheets

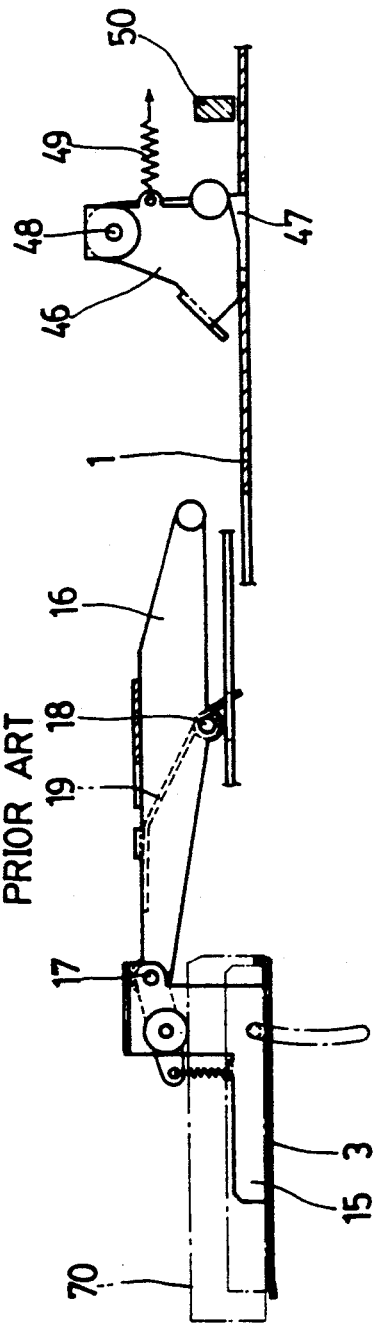
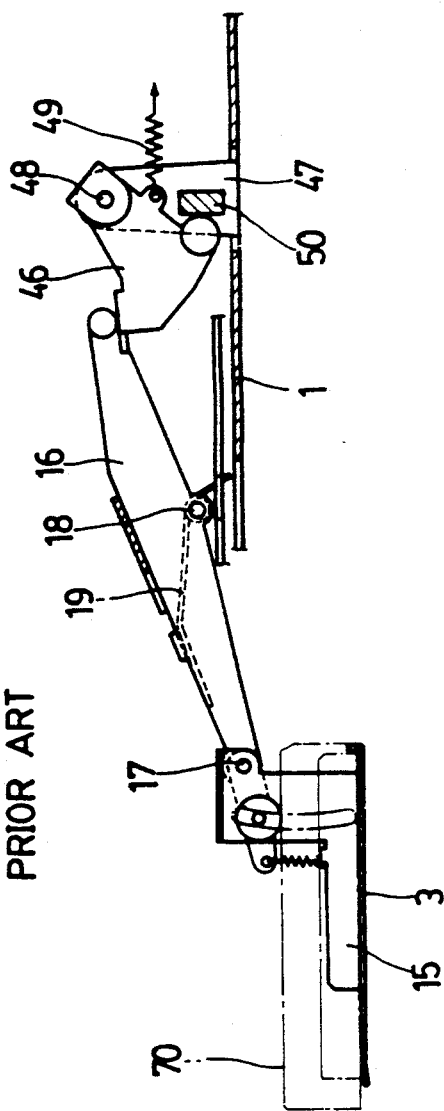
FIG. 3A PRIOR ART
FIG. 3B PRIOR ART

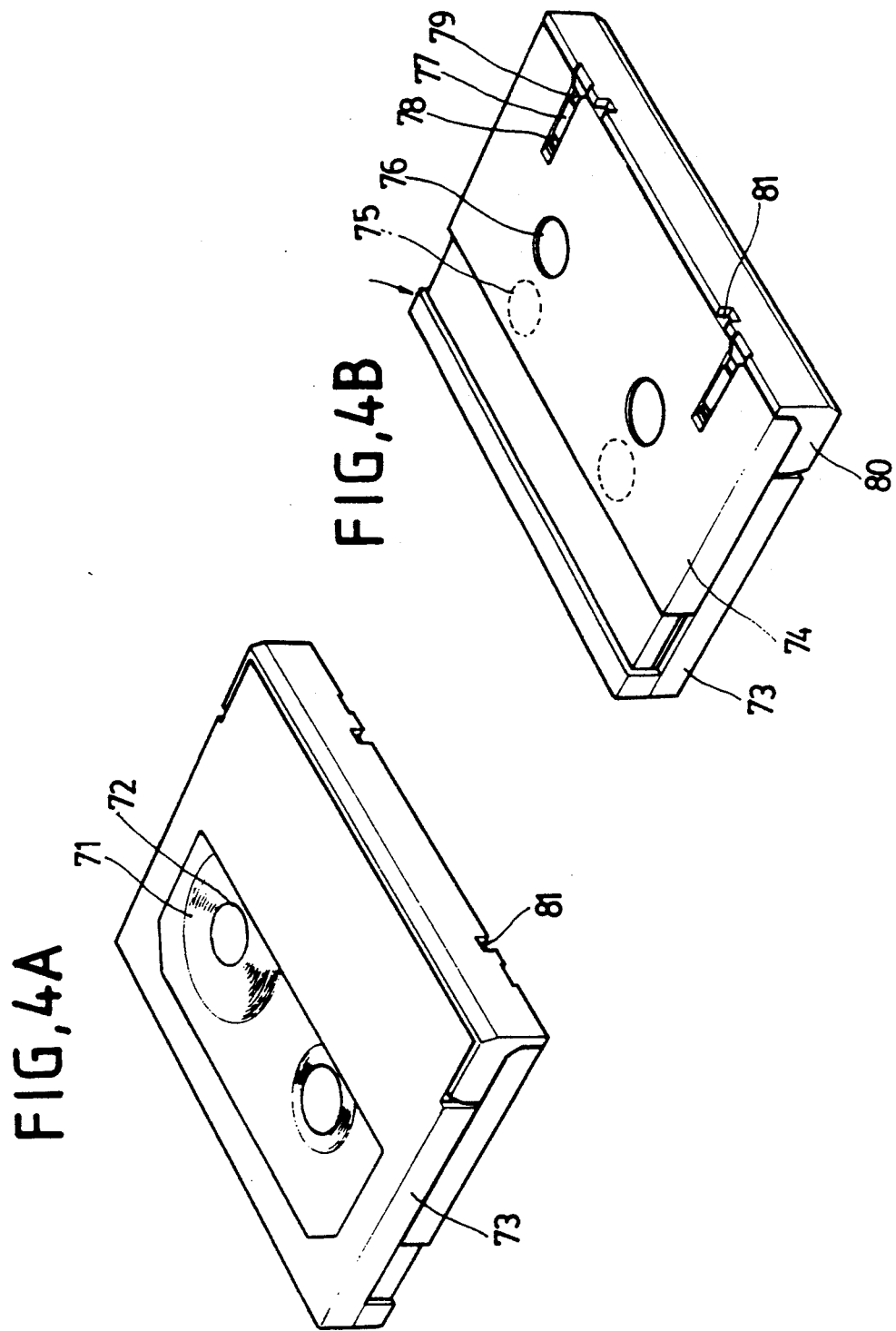

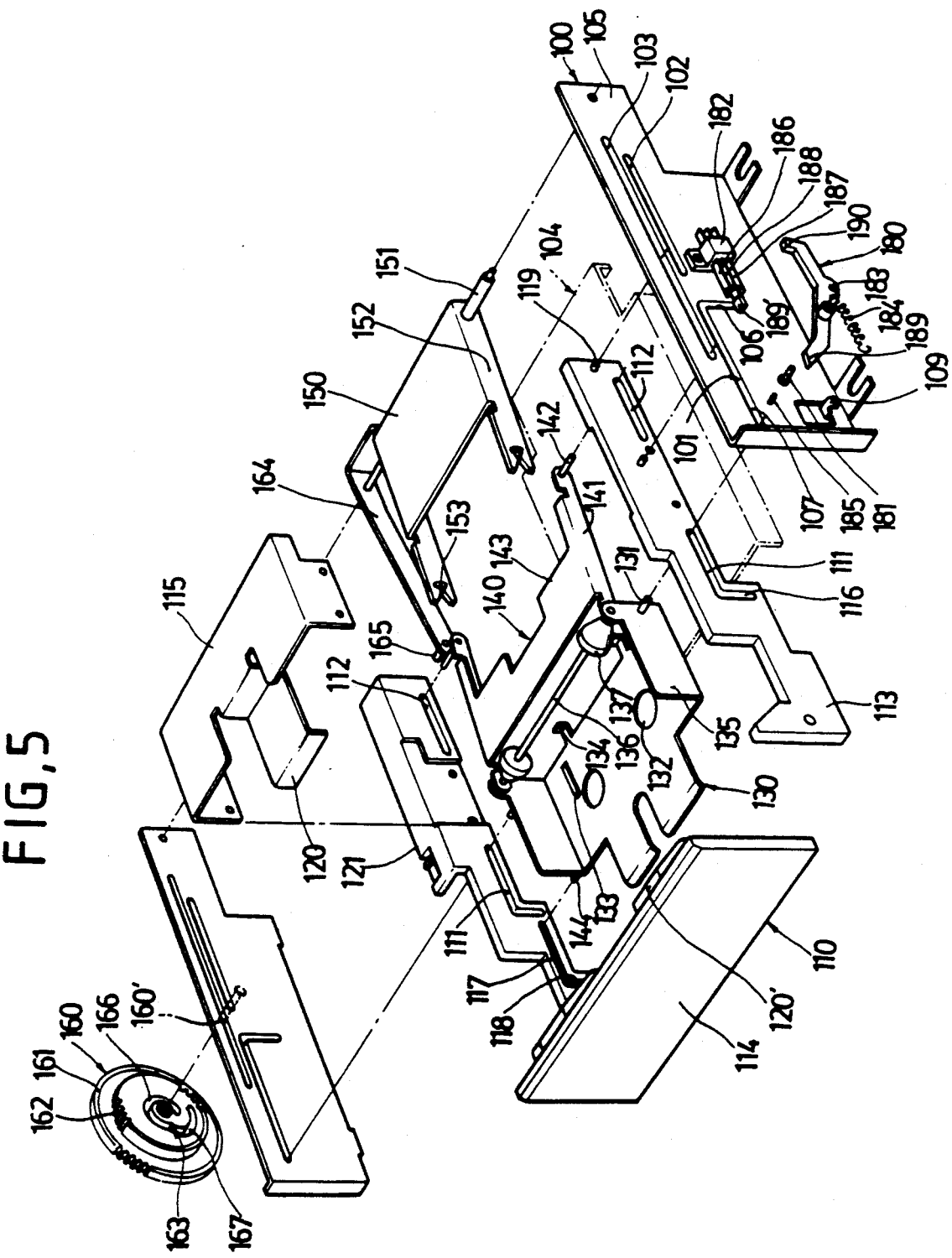

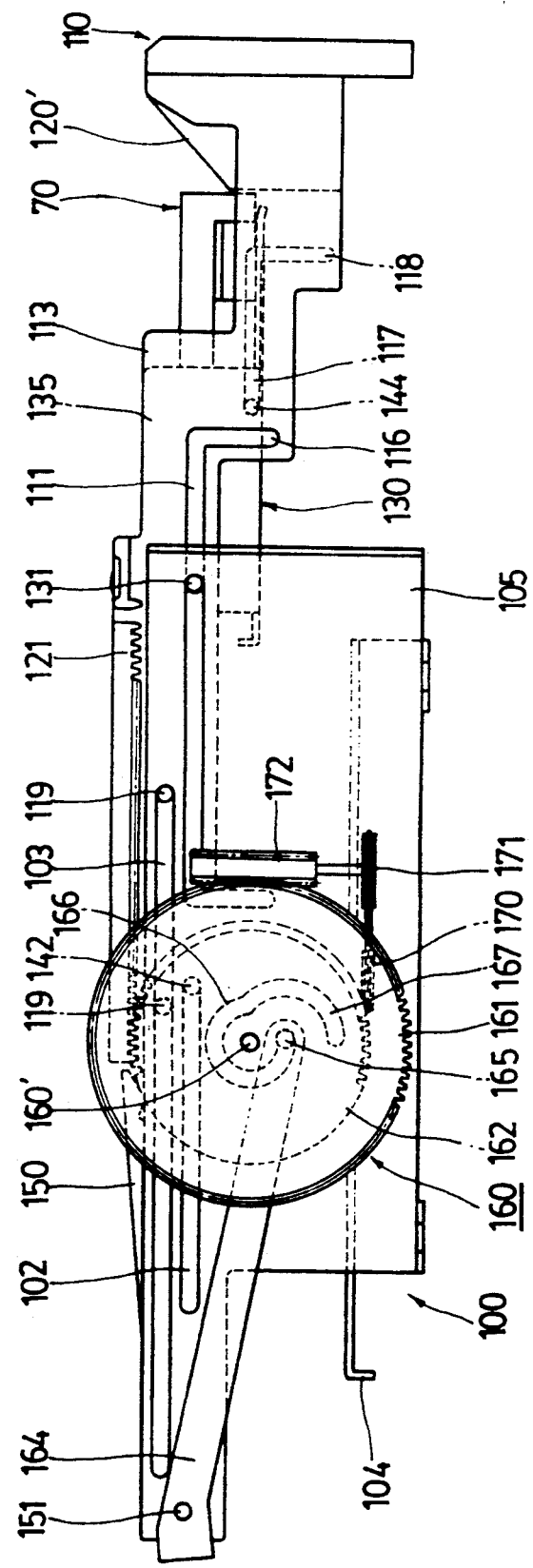

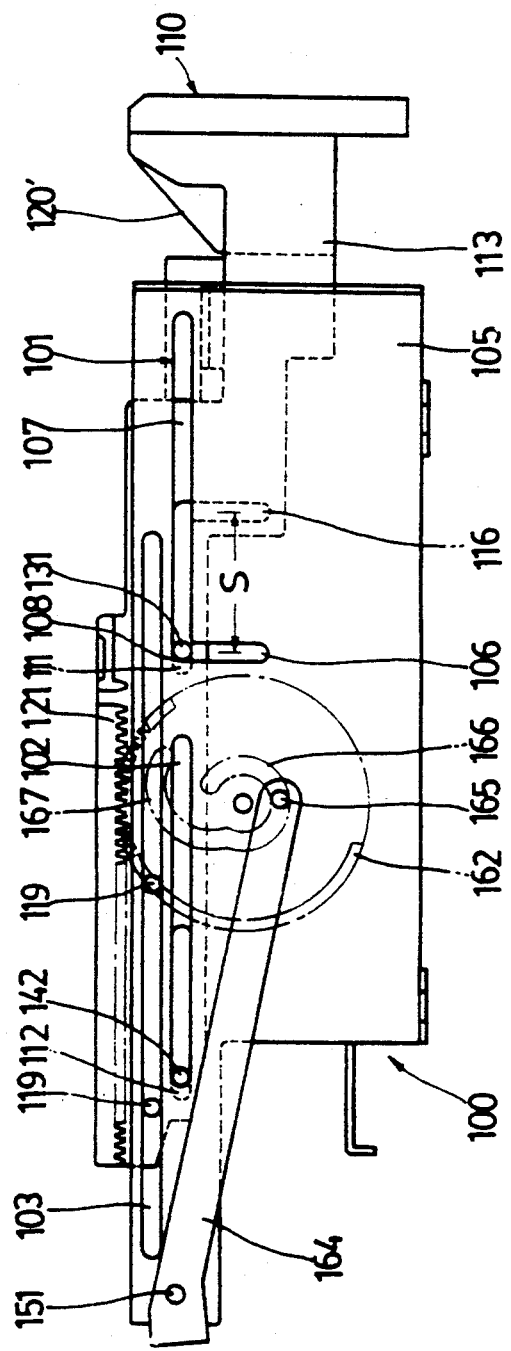

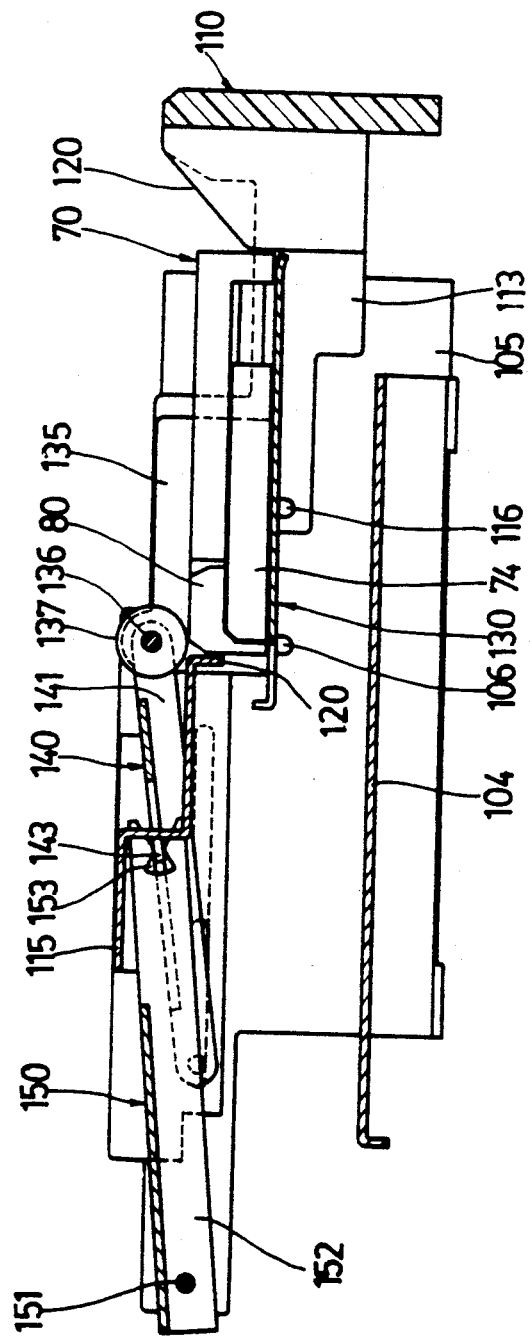

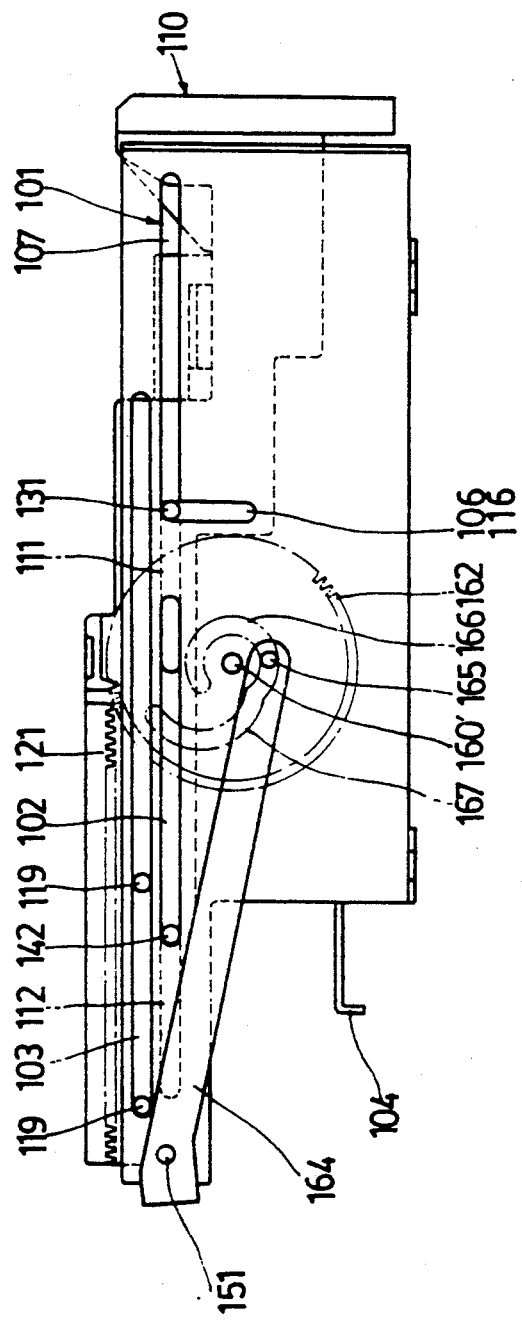

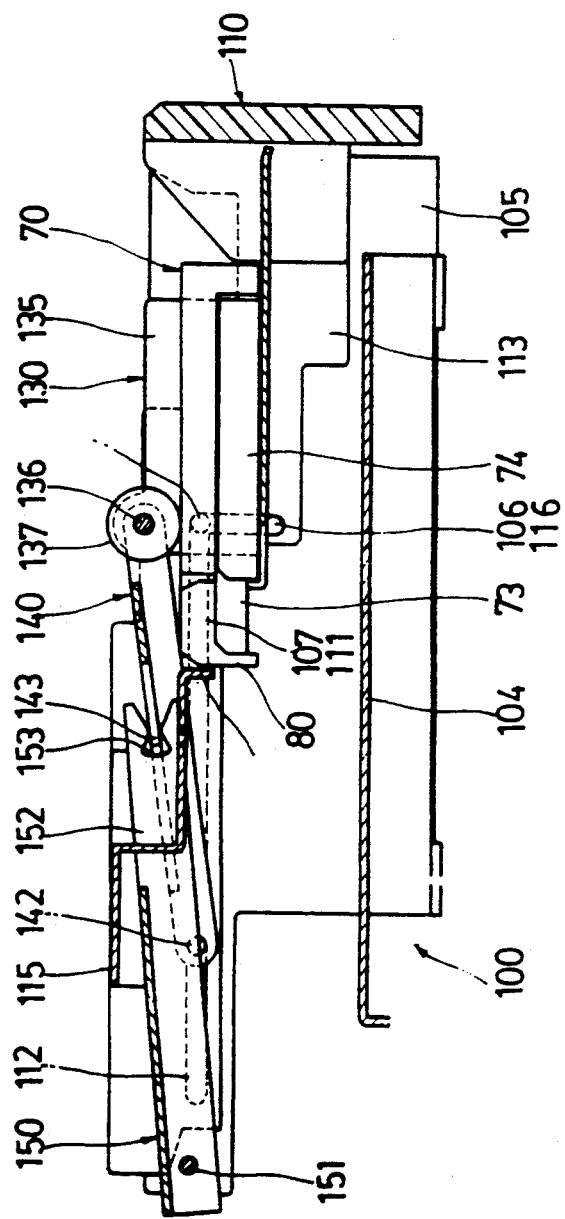

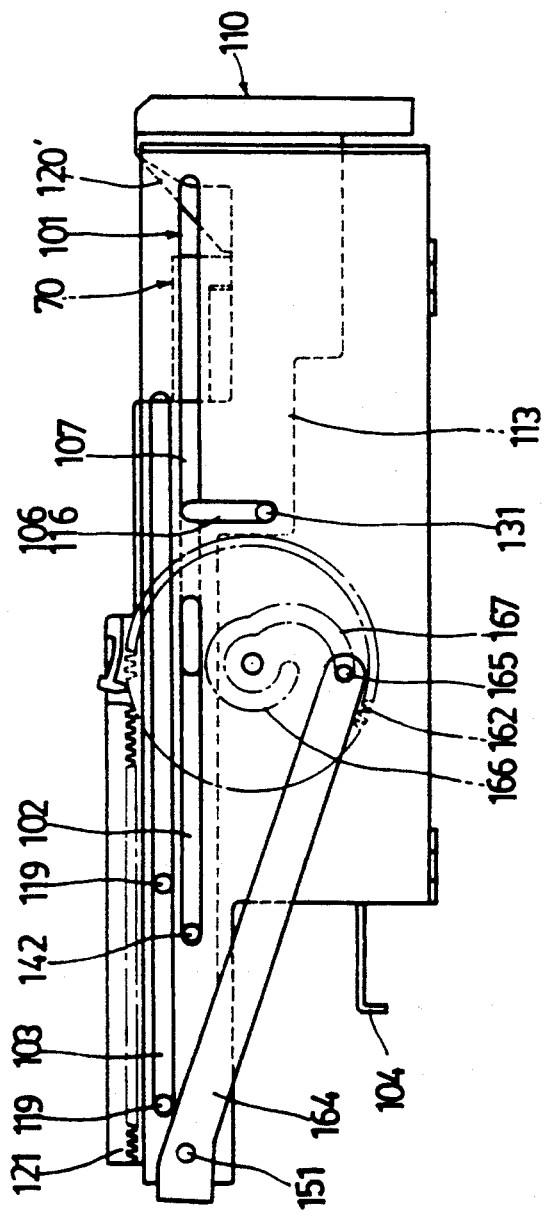

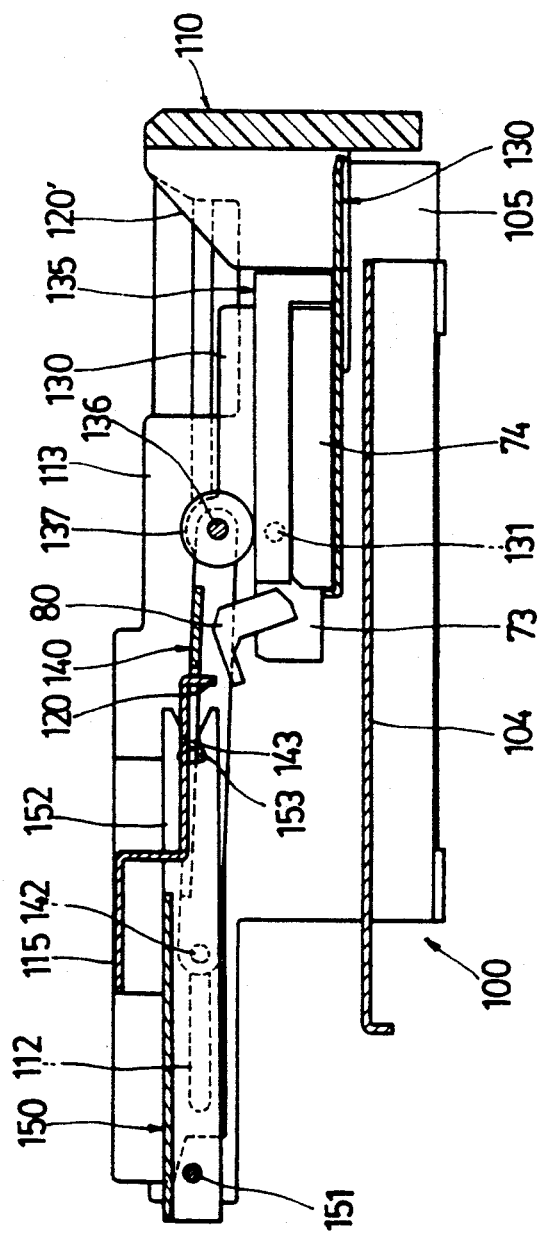

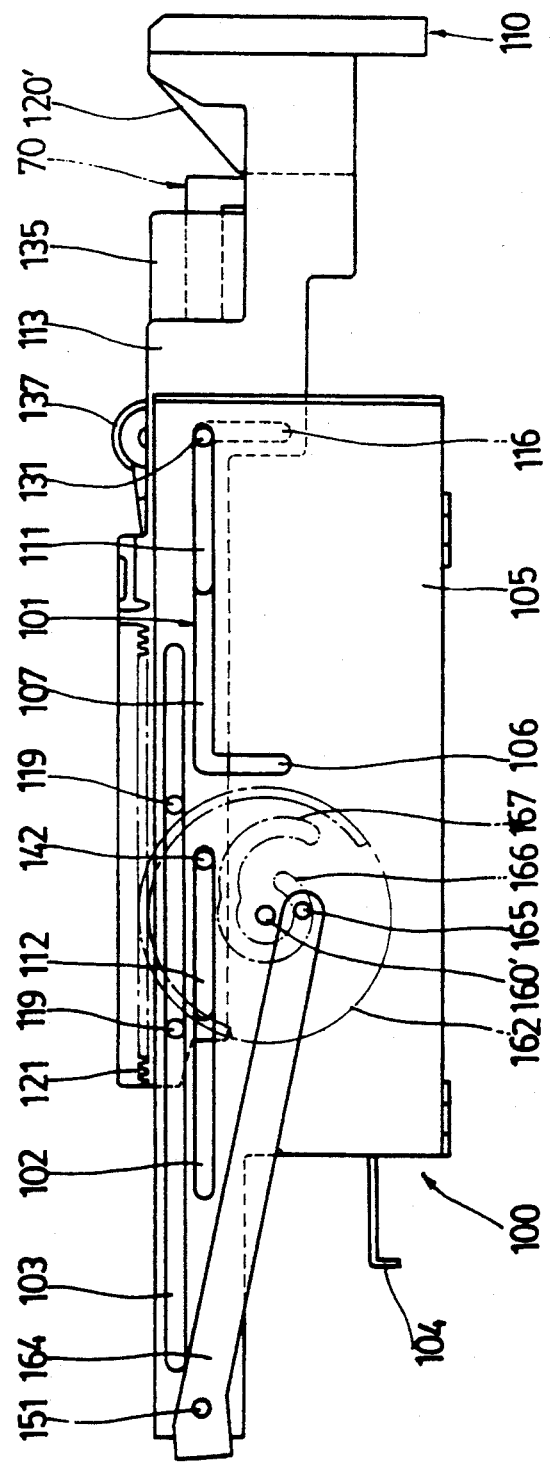

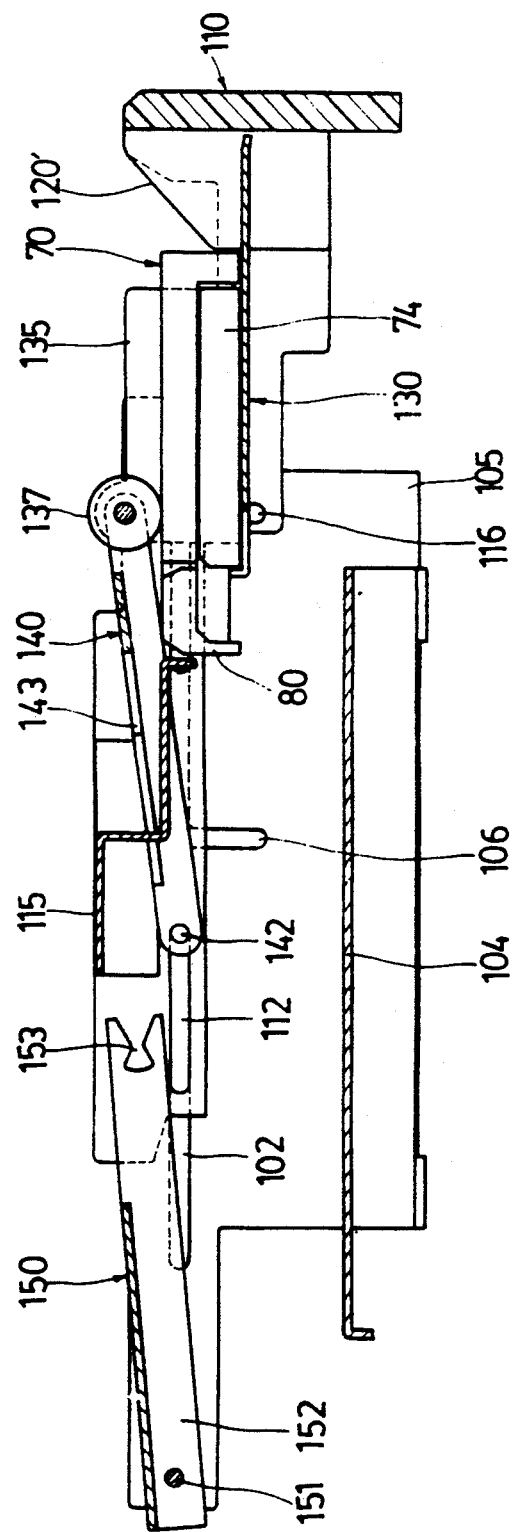

CASSETTE LOADING APPARATUS FOR DIGITAL AUDIO TAPE RECORDER

BACKGROUND OF THE INVENTION

The present invention relates to a cassette loading apparatus for digital audio tape recorder (DAT) and more specifically relates to a cassette front loading apparatus for a DAT having tray type loading effected by moving a cassette horizontally and vertically.

A conventional DAT is formed such that a tape cassette containing an audio tape is positioned on reel tables within an interior of the apparatus, the tape is drawn out of the cassette and connected to a rotary head drum, thereafter the tape is driven by the driving force of a capstan motor, whereby recording and reproduction of the tape can be executed. In such a DAT, a practical form of the conventional cassette front loading apparatus for moving a tape cassette from the exterior to the interior of an apparatus will be explained in detail with reference to FIGS. 1 to 3 as follows.

In FIGS. 1, 2 and 3 of the drawings, the reference numeral 1 is a base plate, 2 is a cassette tray reciprocally and linearly movable against the base plate 1, 3 is a cassette holder which carries a DAT cassette 70 (refer to FIGS. 4 and 5) by moving with the tray 2, 4 is a loading motor for loading the cassette tray 2 and the cassette holder 3, 5 is a cassette lift and drop motor which moves downwardly a predetermined length successively from the state when the cassette holder 3 finished the horizontal movement, 6 is a slider opening plate which opens a slider 74 of a cassette 70, 7 is a push lever which properly and safely sets the cassette 70 into the cassette holder 3 when loading a cassette 70, 8 is a take out lever which takes out said cassette 70 from the cassette holder 3 when loading another cassette 70, 9 is a driving gear which transfers the driving force of the cassette lift and drop motor 5, 10 is an opening operation plate which actuates the slider opening plate 6 by being coupled with the driving gear 9, and 11 represents a lift and drop operation plate which drops the cassette holder and the cassette 70 by being coupled with the driving gear 9, respectively.

Guide bars 12 are affixed tightly to the sides of the base plate 1 and linear bearings 14 are arranged on both side plates 13 of said cassette tray 2 into which the guide bars 12 are inserted so that the cassette tray 2 linearly, rides along the guide bars 12.

The side plates 15 of the cassette holder 3 are movably connected to the respective rotation lever 16 by connecting pieces 17 and each rotation lever is rotatably fixed at the respective side plate 13 of the cassette tray 2 by axial pins 18, the axial pins 18 holding torsion springs 19 that resiliently supports the rotation levers 16 in a clockwise direction.

The loading motor 4 is fixed to the base plate 1. A pulley 22 is mounted on the bottom of the base plate 1, the pulley 22 being connected via a belt 21 to a pulley 20 fixed to a shaft of the loading motor 4. A gear 24 is connected to a gear 23 formed integrally therewith, a pulley 25' connected by a belt 26 to a pulley 25 formed integrally therewith, and the belt 26 is connected to connecting pieces 27 affixed to the cassette tray 2. Therefore, the cassette tray 2, cassette holder 3, rotation lever 16 and take out lever 8 can be moved together linearly.

The lift and drop motor 5, to which shaft a pulley 28 is fixed, is connected to a pulley 30 formed integrally with a worm 29 by a belt 31, and the worm 29 is meshed with the driving gear 9. At the lower surface of the driving gear 9, a small gear having a cam groove 33 at the peripheral surface thereof is integrally formed and is meshed with a rack 34 formed at a side edge portion of said lift and drop operation plate 11. At the lower portion of the driving gear 9, a cam lever 36 is rotatably mounted with a shaft pin 35 and a cam pin 37 provided on the upper surface of the cam lever 36 is inserted into the cam groove 33 of the driving gear 9 and, at the same time, another cam pin 37' is inserted into a rectangular guide hole 39 of the opening operation plate 10 through a pierced hole 38 formed at the based plate 1, and the cam lever 36 and the opening operation plate 10 are connected by a tension spring 40.

The opening operation plate 10 is connected to the slider opening plate 6 by a shaft 41, the slider opening plate 6 and the opening operation plate 10 being connected to one and other by a tension spring 42. The slider opening plate 6 is formed with a cassette hooking piece 43 at a front end portion and a contacting piece 44 is formed at a rear portion, whereby the contacting piece 44 is allowed to contact a 2-stage cam step portion 45 mounted on the lift and drop operation plate 11.

At a side of the lift and drop operation plate 11 of the base plate 1 there is affixed a rotation relay lever 46 by a shaft 48 on a supporting piece 47 protruding from the base plate 1. The lever is urged by a tension spring 49. When the lift and drop operation plate 11, moves forward the lever 46 it is pushed by its protrusion 50 and the lever 46 accordingly rotates the rotation lever 16.

The push lever 7 is formed such that when the cassette tray 2 is loaded, it rotates, contacting a contact plate 51 which is formed by being bent downwardly at a frontward portion of the base plate 1, and it is allowed to rotate a push bar 52 through the gear and the coupling movement mechanism of the cam.

The cassette take out lever 8 is fixed by a shaft pin 54 at a supporting plate 53 fixed between both side plates 13, 13 of the cassette tray 2. The take out lever 8 and the supporting plate 53 are connected by a tension spring 55 which resiliently urges the take out lever 8 counter clockwise, and it is formed such that an inclined cam 56 is fixed to a predetermined portion of the base plate 1 so that the take out plate 8 is slides.

The rotating direction, starting, stopping, etc. of the loading motor 4 and cassette lift and drop motor 5, are determined in accordance with the combination of ON/OFF signals of the first, second, third and fourth location detecting switches 61, 62, 63, 64 fixed respectively at a predetermined location on the base plate 1.

FIGS. 4 and 5 show a DAT cassette. As shown in the drawings, a tape cassette 70 is provided such that a slider 74 can be opened and closed in a sliding manner with respect to a main body 73 in which a magnetic tape 71 is wound on reels 72. The reel hub exposing holes 75 are formed on both sides of the main body 73. The slider 74 is formed with pierced holes 76 which are aligned with the reel hub exposing hole 75 of the main body 73 when it is open. A guide hole 77 is provided adjacent both sides of the pierced hole 76 for receiving the release protrusion 57 of the cassette holder 3. At the same time the front portion of each of the guide holes 77 are formed to have a lock hole 79 for receiving, a lock 78 protruding from the interior of the main body 73, and a protect cover 80 is coupled by a hinge to the main body 73. A groove 81 into which the hooking piece 58 of the cassette holder 3 is inserted is formed in the cover 80.

A DAT cassette of this type is loaded and unloaded into the interior of DAT by the front loading apparatus, the loading operation being executed by a step in which it is carried on the cassette holder 3 and moved a predetermined distance into the interior of the apparatus and by a step by which the cassette is moved vertically and set safely and properly on the reel table mounted at the base plate 1, the slider 74 being opened at the time of horizontal movement and the protecting cover 80 being opened at the time of vertical movement.

The loading and unloading operation of a cassette in accordance with the conventional cassette front loading apparatus as described hereinbefore is as follows.

FIGS. 1, 2 and 3A show the state when a cassette tray is ejected. At this moment a protrusion 59 of the connecting piece 27 fixed at a cassette tray 2 contacts a first location detecting switch 61 which turns on and the loading motor 4 is stopped.

In this condition, a cassette 70 is put in a cassette tray 2 and when the cassette tray 2 is pushed slightly inwardly (rearwardly), the first location detecting switch 61 turns off and the loading motor 4 rotates positively, the cassette tray 2 together with the cassette holder 3 and the cassette 70 are pushed inwardly, the push bar 52 moves from the guide hole 60 of the cassette tray 2 through the gear and the coupling movement mechanism of the lever when the push lever 7 being contacted by the contact plate 51 and then rotated, the cassette 70 is pushed by push bar 52 and is slightly moved inwardly and the release protrusion 57 of the cassette holder 3 is inserted into its guide groove 77 and the lock of slider 74 is released at the same time the hooking piece 58 is inserted into the inserting hole 81 to which hooking piece 58 of the front edge portion of slider 81 is hooked up, and it is supported stably by which the top surface is pressed into the rubber pressing roller 65 fixed adjacent to. the connecting piece 15 of cassette holder 3. After the cassette 70 is set stably in the cassette holder 3 in this condition the cassette tray 2, cassette holder 3 and cassette 70 are moved continuously to inwardly by the driving power of the loading motor 4. Then the protrusion 66' formed at a side plate 13 of cassette tray 2 actuates the second location detecting switch 62 which is thereby turned on, and then the loading motor 4 is stopped and the horizontal movement of the cassette tray 2 is completed. Subsequently the cassette lift and drop motor 5 is rotated and the worm 29 and driving gear 9 are rotated and then the lift and drop driving plate 11 meshed with the small gear 32 of the driving gear 9 are moved frontwardly and then the protruded piece 66 moves away from the third location detecting switch 63 and the third location switch 63 turns. When the lift and drop operation plate 11 is moved, the contact piece 44 of the slider opening plate 6 contacting the cam step portion 45 is lifted up, and the slider opening plate 6 is rotated counterclockwise (based on FIG. 1) around the shaft 41 and contacts the top surface of the cassette 70. The driving gear 9 is rotated continuously by the driving power of driving motor 5, the lift and drop plate 11 is kept moving frontwardly at the same time the opening operation plate 10 is moved rearwardly by the operation of the cam lever 36 and the cam groove 33 of the bottom surface of driving gear 9 and the slider opening plate 6 are moved together rearwardly. Thus the slider opening plate is moved, and the hooking piece 43 hooks the cassette main body 73 and moves, whereby the cassette main body 73 is moved together. At this moment the slider 74 is hooked to the cassette holder 3 and the movement is stopped, whereby the slider 74 is opened and its pierced hole 76 and the reel hub exposing hole 57 of main body 73 are aligned with one another.

Thereafter, since the driving gear continues rotating, the cam lever 36 cooperatively moves along with the cam groove 33, whose pin 37 contacts the concentric circle portion of the cam groove 33. The rotation is stopped at the same time, and accordingly the opening operation plate 10 and the slider opening plate 6 also are stopped, but the lift and drop plate 11 are allowed to keep moving frontwardly as in FIG. 3B, the protrusion 50 on which lift and drop plate 11 rotates the rotation relay lever 46. Upon rotating relay lever 16, the cassette holder 3 connected thereto is moved downwardly and vertically and is set stably on the reel table coupled to the predetermined portion of the base plate 1. At this moment the protrusion 67 protruding from the lift and drop plate 11 actuates the fourth location detecting switch 64. Then the cassette lift and drop motor 5 is made to stop.

In the above described process, summarizing the operation of the location detecting switches, if the state when the first to fourth location detecting switches 61–64 are depressed is supposed to be ON, in case of ejecting when the first location detecting switch 61 is ON then the loading motor 4 and the lift and drop motor 5 must stop; when the first location detecting switch 61 is OFF and the third location detecting switch 63 is ON then the loading motor 4 must positively rotate and continue to rotate until the second location detecting switch 62 is ON; when the second location detecting switch 62 is ON when the third location detecting switch 63 is ON then the loading motor 4 must stop and the lift and drop motor 5 is rotated positively and the cassette 70 must seat on the reel tables. When the cassette is set then the fourth location detecting switch 64 turns ON by contact with the protrusion 67 of the lift and drop operation plate 11 and the lift and drop motor 5 must stop and to recognize the state of the cassette 70 being set.

When the cassette 70 is set on the reel tables, the tape 71 contained in the cassette 70 is drawn by the tape running mechanism and is applied to a rotary head drum and caused to run by the driving power of the capstan motor, the recording or reproducing then being executed (the rotary head drum, capstan motor and tape running mechanism are not shown in drawings).

After the playing and recording are executed as described above, when it is intended to eject the cassette, the ejection is effected by the reverse of the above procedure, such that when the cassette tray 2 is moved frontwardly and horizontally, the contact piece 68 of the take out lever 8 connected thereof contacts the inclined cam 56 fixed to the base plate 1 and is rotated in clockwise around the shaft pin 54, and the cassette 70 by which the take out piece 69 is adhered with pressure to the cassette holder 3 by the rubber pressure roller 65 is pushed out slightly forward so that a user can easily take out the cassette 70.

Since a conventional DAT front loading apparatus as described above uses the loading motor in order to move the cassette holder and cassette horizontally, and it uses the lift and drop motor in order to move the cassette holder and cassette vertically, both loading and unloading motors are required for loading and unloading of the cassette. Also, since it is formed with very complicated structure in requiring a device for setting the cassette at the cassette holder stably, a device for moving the cassette horizontally, a device for opening the slider, a device for lifting and dropping the cassette, a take out device to take out the cassette easily from the cassette holder, and the location detecting switch device, since all of these require so many parts, disadvantages arise and productivity is decreased and the manufacturing cost is increased.

SUMMARY OF THE INVENTION

Therefore, the object of the present invention is to overcome the disadvantages of the prior art apparatus described above, and to provide a cassette front loading apparatus for a DAT that does not require separate loading and unloading motor for loading and unloading the cassette, by providing a capstan motor and simplified mechanism.

Another object of the present invention is to provide a cassette front loading apparatus for a DAT wherein a rack shaped to the driving mechanism and a cassette tray are cooperatively moved by the driving power of the capstan motor, the cassette tray, cassette holder and cassette are supported with the guide holes of both side brackets fixed tightly at both sides of the base plate and moved with the horizontal guided movement, at a stage that the cassette tray is horizontally moving, the cassette tray is moved with an overstroke of a predetermined distance and then the slider is opened so that the horizontal moving mechanism of the cassette and the slider opening mechanism are simplified.

A further object of the present invention is to provide a cassette front loading apparatus of a DAT whereby when the cassette holder and cassette have completed the horizontal movement, the cam lever and turning plate cooperatively connected to the cam groove of the internal surface of said driving gear are turned and accordingly the cassette holder is moved downwardly and so that the lift and drop mechanism is simplified.

Still another object of the present invention is to provide a cassette front loading apparatus of a DAT whereby during cassette ejection, a state when the cassette holder completes the horizontal movement, the cassette tray is moved with an overstroke as for a predetermined distance and then the protrusion of the supporting plate fixed thereto pushes the cassette out from the cassette holder so that the cassette take out mechanism is simplified.

A still further object of the present invention is to provide a cassette front loading apparatus of a DAT in which a leap switch fixed at a side bracket of the base plate is operated by the switch lever operated by the guide piece of the cassette holder and then the operating location of the mechanism is detected and accordingly the driving of the capstan motor is controlled so that the location detecting switch device of the mechanism is simplified.

BRIEF DESCRIPTION OF THE DRAWINGS

FIGS. 3A and B are sectional views showing the cassette lift and drop mechanism of FIG. 1.

FIGS. 4A and B are perspective views of a conventional DAT cassette.

FIG. 5 to FIG. 11 show the structures and operations of a cassette front loading apparatus according to the present invention, in which;

FIG. 5 is an exploded perspective view of the entire cassette front loading apparatus.

FIGS. 7A and 7B are respectively a side view and a sectional view showing the apparatus immediately before the slider of the cassette is off after the horizontal movement of the cassette holder is completed during the process of the cassette being loaded.

FIGS. 8A and 8B are respectively a side view and a sectional view showing the apparatus immediately before the cassette moves vertically after the cassette tray is moved with an overstroke and the slider is taken off when the horizontal movement of the cassette holder has been completed.

FIGS. 9A and 9B are respectively a side view and a sectional view showing a state wherein the cassette loading is completed.

FIGS. 10A and 10B are respectively a side view and a sectional view showing apparatus immediately before the slider is closed after the horizontal movement of the cassette holder is completed during the process of the cassette being unloaded.

FIGS. 11A, B and C are side views which show the location detecting switch mechanism according to the present invention, in which;

FIG. 11A is a side view showing the apparatus when the upper terminal and intermediate terminal of the leap switch are connected when the cassette tray is being ejected.

FIG. 11B is a side view showing the apparatus when the intermediate terminal and the upper and lower terminals of the leap switch are separated with the cassette tray being loaded.

FIG. 11C is a side view showing the apparatus when the intermediate terminal is connected with the lower terminal of the leap switch being set such that the cassette tray is loaded.

DETAILED DESCRIPTION OF THE INVENTION

Figure 1:
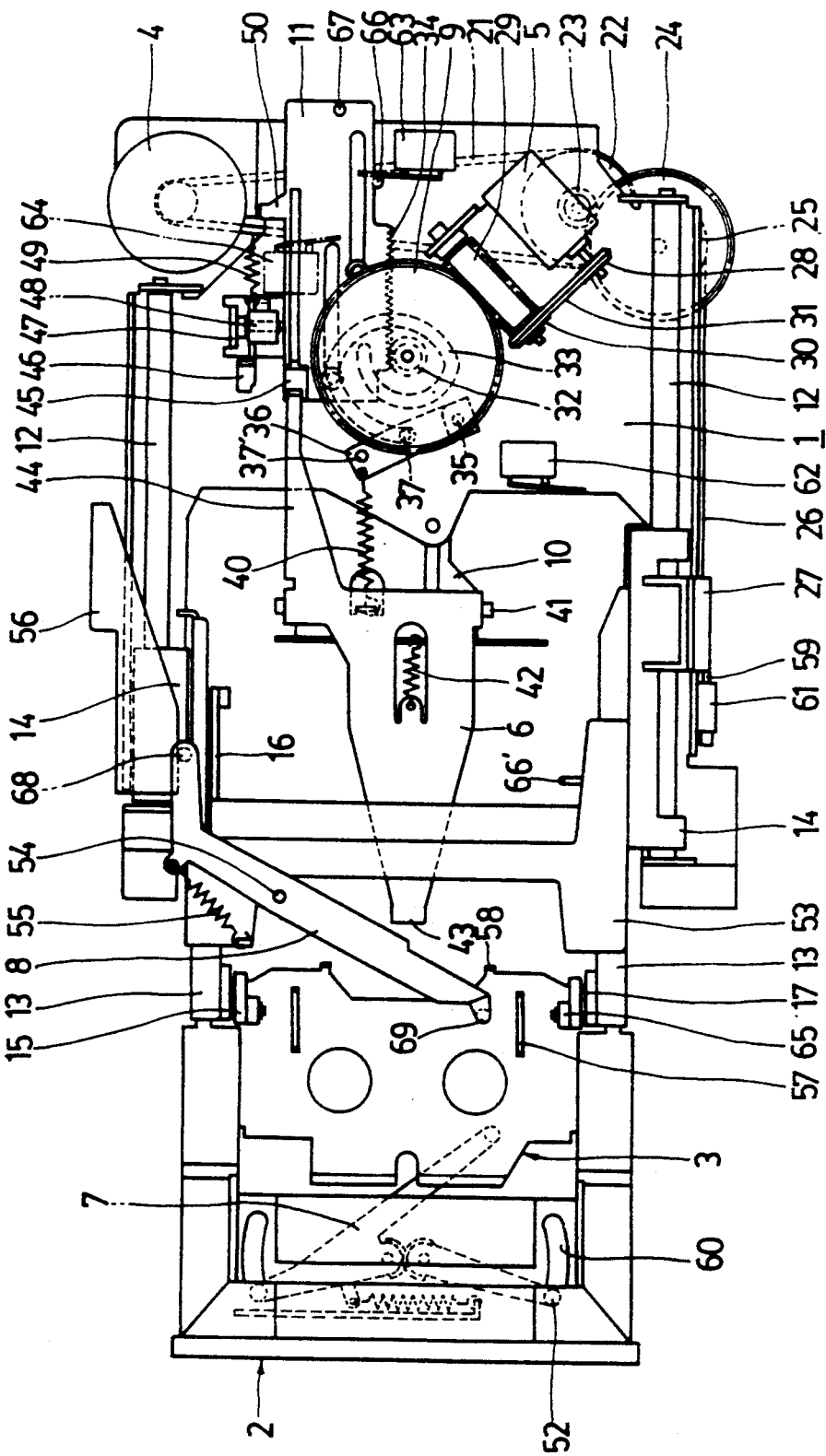
FIG. 1 is a top view of a conventional cassette front loading apparatus which is shown at a state when a cassette tray is ejected.
Figure 2:
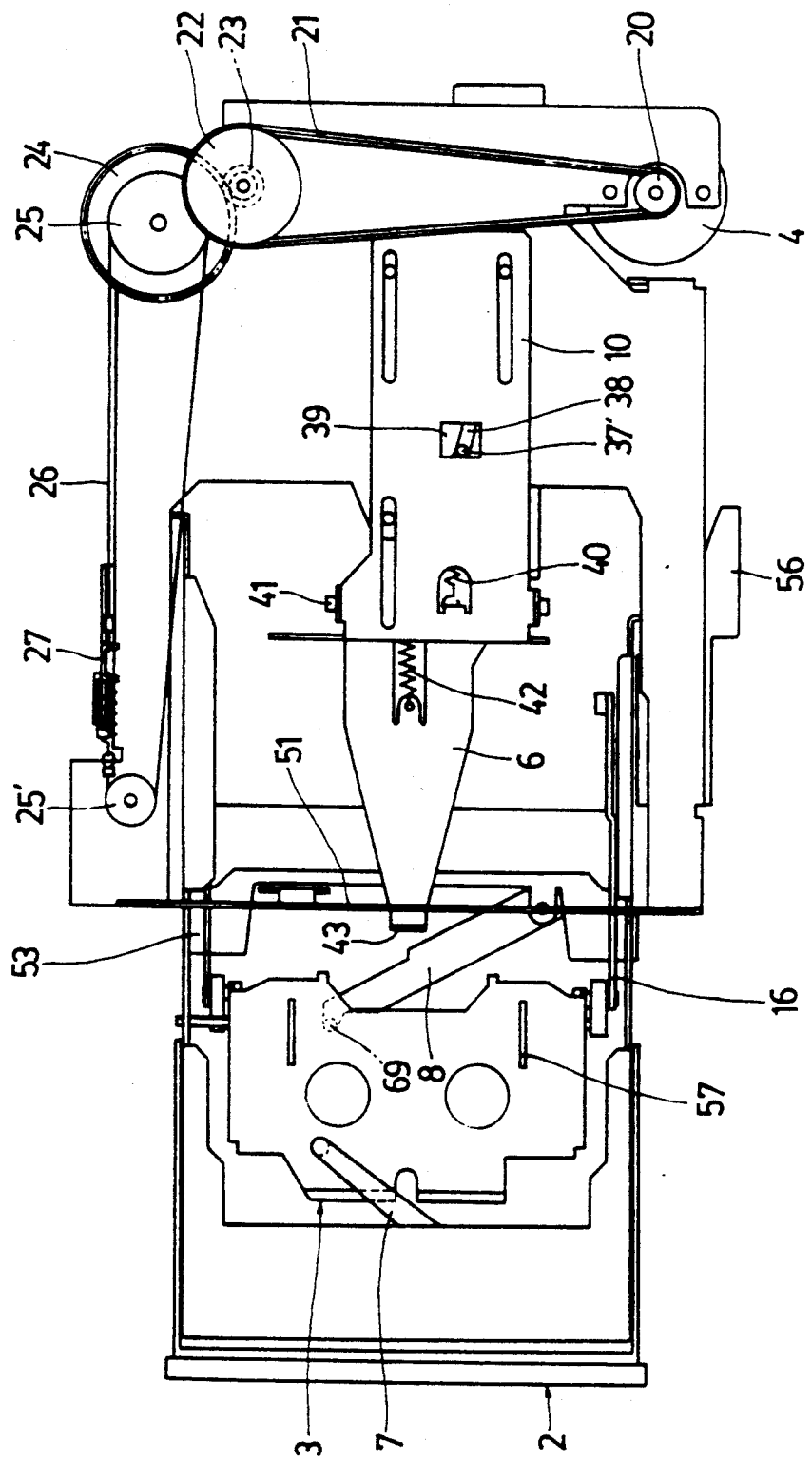
FIG. 2 is a bottom view of FIG. 1.

Hereinafter, the present invention described above is explained in more detail with reference to the accompanying drawings FIG. 5 to FIG. 11 as follows.

The cassette front loading apparatus for a DAT according to the present invention comprises a main body 100, a cassette tray 110 which linearly moves inwardly relative to main body 100, a cassette holder 130 and a lift and drop plate 140 arranged at the cassette tray 110, and a rotating plate 150 mounted on a rearward portion of the main body 100.

The main body is structured such that a pair of bracket 105 are fixed at both side portions of a base plate 104 and first and second guide holes 101 and 102 are respectively formed on the same straight line, and the third guide hole 103 is located along the upper side, and a vertical portion 106 is formed integrally crossing the rear end portion of the first guide hole 101.

The cassette tray 110 is structured with both side slider plates 113 located at the inner side of the bracket 105, a door 114 mounted at the front end portion, and a supporting plate 115 fixed at an intermediate portion.

At both slider plates 113, the first guide holes 111 and second guide holes 112 are formed on the same straight line, a vertical portion 116 is integrally formed so as to be crossed perpendicularly at the rear end portion of the first guide holes 111, and the guide pins 119 fixed at both side slider plates 113 are inserted into the third guide hole 103 of said bracket 105.

A pair of pierced holes 132 are formed at said cassette holder 130, a release protrusion 133 and a hooking piece 134 are respectively formed at the rearward portions of the pierced holes 132, the guide pins 131 fixed at a center of the rearward portion of both side surfaces 135 of the cassette holder 130 are inserted into the first guide holes 111, 101 of said slider plate and bracket 105, and a guide pin 144 formed at the lower side of the frontward portion of a side surface 135 is inserted into the guide hole 117 formed at the internal surface of a side slider plate 113. A guide hole 117 is formed integrally with the vertical portion 118 at the end portion as a first guide hole 111.

The aforesaid lift and drop plate 140 are formed with a guide pin 142 at the rear end portions of both side surfaces 141, whose guide pins 142 are respectively inserted into the second guide holes 112, 102 formed at said slider plate 113 and bracket 105, and both side surfaces 141 of the lift and drop plate 140 and both side surfaces 135 of the cassette holder 130 are connected by a shaft bar 136, and a rubber pressure roller 137 for supporting the cassette 70 so that it is secured to the shaft bar 136.

The guide pins 131, 142, 144 and 119 support the cassette holder 130, the lift and drop plate 140 and the cassette tray 110 at the bracket 105 of the main body 100, and guide their horizontal movement, and also guide the vertical movement of the cassette holder 130. The guide pins 131, 142 can move horizontally together with the cassette holder 130 and the lift and drop plate 140 as far as the length of the first guide hole 101 and second guide hole 102 of both side bracket, and their movement stops when the guide pins 131, 142 contact the front end portion or rear end portion of the first, second guide holes 101, 102 of the side brackets 105, and this cassette tray 110 can further move outside or inside as far as the length of the horizontal portion of the guide groove 117 and the first, second guide holes 111, 112 formed at both slider plates 113. That is to say, the horizontal length of the guide groove 117 and the first, second guide holes 111, 112 render possible the overstroke of the cassette tray.

A take out protrusion 120 is formed at the intermediate portion of the supporting plate 115 of the cassette tray 110, and a inward drawn protrusion 120' is affixed at both sides on the internal surface of a door 114 of the cassette tray 110.

A driving gear 160 which has a large gear 161 and a small gear 162 in whose internal surface a cam groove 163 is formed is affixed by a shaft pin 160' at a side bracket 105 of main body 100. A rack which is formed longitudinally at a side slider plate 113 of the cassette tray 110 is meshed with the small gear 162 of the driving gear 160. A worm 172 which rotates by receiving through a power transmission means 171 the driving power of the known capstan motor 170 mounted at the base plate 104 of the main body 100 at the large gear 161, is meshed with the gear 160.

As for power transmission means, pulley, belt and gear train etc. can be utilized, and the structure also can be constructed with a variety of these transmission means.

The turning plate 150 is affixed at the intermediate portion of the shaft bar 151 affixed rotatably at the rear end portion of both side brackets 105 of the main body 100, both side surfaces 152 of the turning plate are respectively formed with the connecting groove 153 adjacent to the connecting portion 143 of said lift and drop plate 140. A cam lever 164 is provided on a side surface 152 of the turning plate 150.

The front end portion of the cam lever 164 is provided with a slide pin 165 which is inserted into the internal cam groove 163 of the cam gear 160.

In addition, at the lower side of the guide hole 101 of the other side bracket 105 front portion of said main body 100, the switch lever 180 is provided with the axle pin 181 and a leap switch 182 is mounted adjacent thereto (FIGS. 11A-11C). A tension spring 184 resiliently urges the switch lever 180 clockwise at the protrusion 107 of the other side bracket 105 and the protrusion 183 of the switch lever 180, and a stop pin 185 which controls the revolution is mounted at the upper side of the switch lever 180.

The leaf switch 182 has upper and lower terminals 186, 187 and an intermediate terminal 188, and the front end contact portion 189 of the intermediate terminal 188 is located at the vertical portion 106 of the first guide hole 101.

The switch lever 180, when the cassette tray 110 is ejected, has a front end portion 189 which contacts and presses against the first guide pin 131 of the cassette holder 130, and a rear end portion 190 which pushes up the intermediate terminal 188 of the leap switch 182. Accordingly, the upper terminal 186 and the intermediate terminal 188 of the leaf switch 182 are connected.

The operation and effect of the present invention is as follows.

Figure 6A:
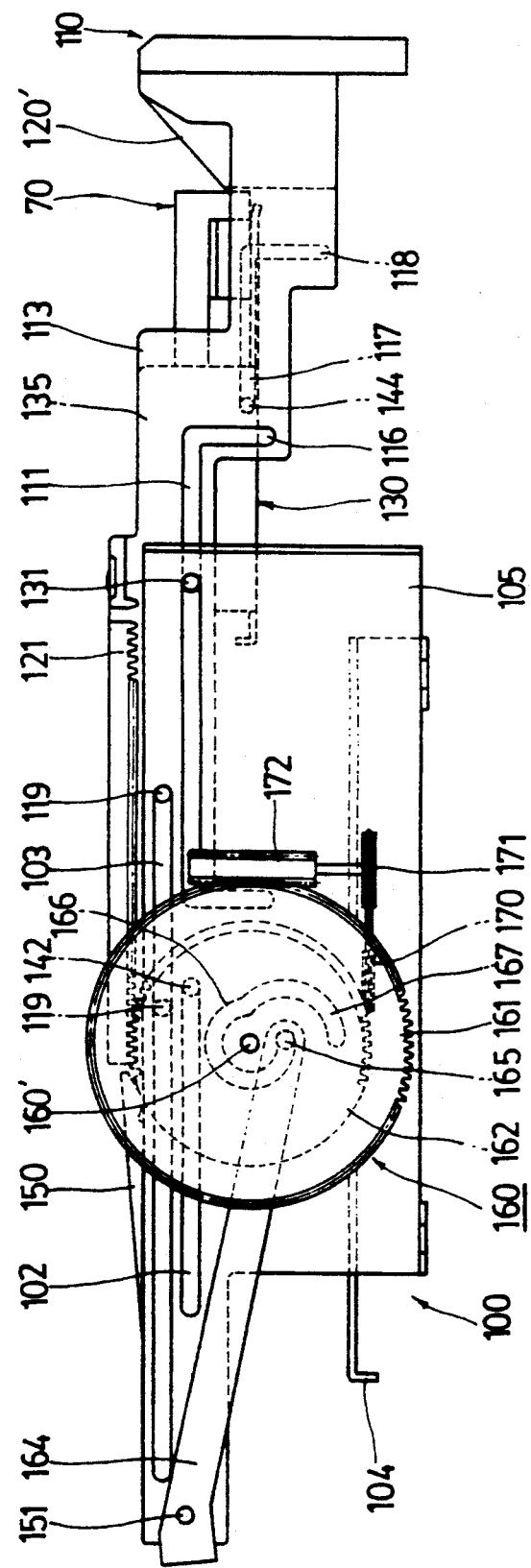
FIGS. 6A and 6B are respectively a side view and a sectional view showing the apparatus before the cassette is loaded.
Figure 6B:
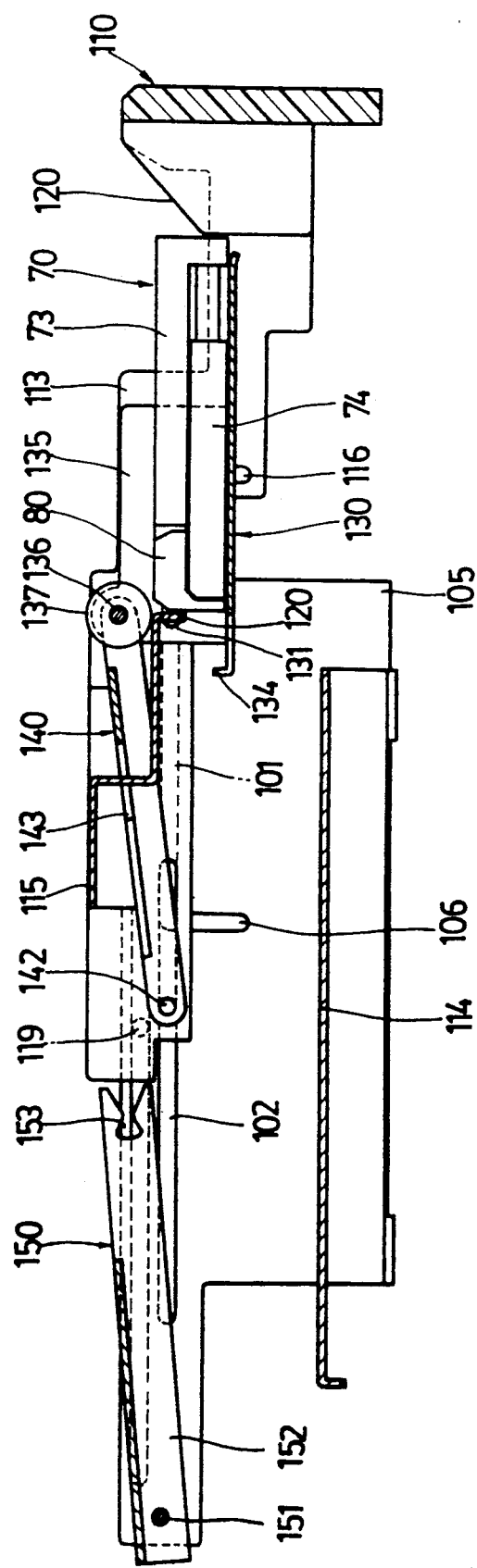

FIGS. 6A and 6B show the state when the cassette tray 110 is completely opened at the main body 100. At this time the guide pin 131 of the bracket 105 and the guide pin 142 of the lift and drop plate 140 are contacted at the right side end portion of the guide holes 101, 102 of bracket 105. As shown in FIG. 11A the guide piece 131 of cassette holder 130 presses the front end portion of the switch lever 180, so that its rear end portion 190 pushes the intermediate terminal 188 of the leaf switch 182 upwardly. Then the intermediate terminal 188 and the upper terminal 186 are contacted whereby the electric power is cut off to the capstan motor 170. Thus when the intermediate terminal 188 and the upper terminal 186 are connected and are turned ON, the DAT syscon (DAT system control micro processor) recognizes that the cassette tray 110 is in the open state. In addition, at this state, the pin 165 affixed at the front end portion of said cam lever 164 is located at the concentric circle portion 166 of the cam groove 163 formed at the driving gear 160.

Thus, when the tray 110 is opened, the cassette 70 is put into the cassette holder 130 and the cassette tray 110 is pushed to the interior a little, the guide piece 131 of cassette holder 130 becomes pushed to the interior whereby the switch lever 180 is turned around the axle pin 181 by the tension spring 184 as in FIG. 11B. The rear end portion 190 of the lever 180 is taken off of the intermediate terminal 188 of the leaf switch 182, whereby the intermediate terminal 188 is changed to a neutral position and removed from the upper terminal 186 and then turned OFF, and the switch lever 180 is restricted so as not to turn any more by being caught by a stop pin 185.

Thus, when the upper terminal 186 and the intermediate terminal 188 of the leaf switch 182 are separated and they are OFF, the electric power is supplied to the capstan motor 170 and it turns, the driving gear 160 cooperatively coupled to the worm 172 turns counterclockwise, and the cassette tray 110 meshed with the rack 121 to the small gear 162 of driving gear 160 moves inwardly.

Thus, the cassette tray 110 moves inwardly and the lift and drop plate 140 and the cassette holder 130 contained within the cassette 70 move together horizontally, and as shown in FIGS. 7A and 7B the guide pin 131 of the cassette holder touches the bent portion 108 which is the intermediate portion between the horizontal portion 107 and vertical portion 106 of the first guide hole 101 formed at the bracket 105.

When this happens, the cassette holder 130 and the lift and drop plate 140 are no longer capable of being moved inwardly and are stopped, and a distance for opening the slider 74 of the cassette 70 as great as S is maintained between the vertical portions 106, 116 of the first guide hole 111 of the tray and the first guide hole 101 of the bracket. At this time, when it is moved more inwardly upon the continuous revolution of the driving gear 160, then the slider 74 of cassette 70 is caught by the hooking piece 134 and can be moved no more, and only the main body 70 is pushed to the inward drawn protrusion 120' formed at the interior of the door 114 and moved inwardly. The slider 74 is opened completely until the first guide hole 111 of the tray 110 is moved as far as the distance S and reaches the state as shown in FIGS. 8A and 8B. At this moment the first guide hole 111 and the vertical portions 116, 106 of the first guide hole 101 of main body coincide. At the same time the inserting portion 143 of the lift and drop plate 140 is inserted into the connecting groove 153 of the turning plate 150.

When this happens, when the driving gear 160 is turned continuously counterclockwise by the rotating power of the capstan motor 170, the pin 165 of cam lever 164 is moved to ride along the radius variation portion 167 of cam groove 163. Accordingly, the cam lever 164 is turned clockwise around the axle shaft 151 and then the turning plate 150 is turned clockwise together with the cam lever 164, in response to the clockwise rotating of the turning plate 150, the lift and drop plate 140 is turned clockwise around the guide pin 142, and the cassette holder 130 connected with the shaft bar 136 thereto is moved vertically and downwardly, whereby as shown in FIGS. 9A and 9B the cassette 70 contained in said cassette holder 130 is set on the supply reel table and take-up reel table arranged at the base plate 104. Thus, when the cassette holder 130 is moved downwardly, the guide pin 131 of the rear end portion thereof is guided to the vertical portions 106, 116 of guide holes 101, 111 of the tray 110 and main body 100 and the front end guide pin 144 is moved downwardly riding along the vertical portion 118 of the guide hole 117 formed at the internal surface of a side plate 113 of the tray 110. During this downward movement the protect cover 80 of the cassette 70 is opened by another separate cover opening means (not shown).

Thus, when the loading of the cassette 70 is completed, in response to the pressing of the intermediate terminal 188 of leaf switch 182 by the guide pin 131 of the cassette holder 130 as shown in FIG. 11C, the intermediate terminal 188 is bent downwardly from the neutral position and connected to the lower terminal 187 and is turned ON and then the electric power is cut off to the capstan motor 170 whereby it is stopped.

Thus, when the cassette loading is completed, the tape 71 contained within the cassette 70 is run by the running drive mechanism arranged on the base plate 104 and so a desired mode such as play is executed. When the cassette 70 is to be ejected, a separate eject button (not shown) arranged at the exterior of main body 100 is pressed, the capstan motor 170 is rotated in the reverse direction and then the driving gear 160 is rotated clockwise, an operation that is the reverse of the above operation is executed whereby the cassette holder 130 is moved vertically. Thereafter it is moved together with the cassette tray 110 toward the exterior of main body 100. At this moment the take out protrusion 120 of the supporting plate 115 affixed to the cassette tray 110 is moved forward slightly pushing the cassette 70 on the cassette holder 130. Thus, when the guide pin 131 of the cassette holder 130 contacts the right side end portion of the first guide hole 101 of the bracket 105 as shown in FIG. 10, then it can no longer be moved forward, and the cassette tray 110 moves further forward a little by an overstroke of the guide holes 111, 112 of cassette tray 110. At this moment the support plate 115 affixed to the cassette tray 110 also is moved forward a little more. When, the cassette 70 which has been pressed and adhered to by the rubber roller 137 formed at the axle shaft of the cassette holder 130 is pushed by the take out protrusion 120 of the supporting plate 115 and is drawn to the exterior of the cassette holder 130, a user can take it out easily.

As described hereinabove, since the present invention, without requiring the separate use of the loading motor and the lift and drop motor for moving the cassette horizontally and lifting and dropping, the loading and unloading of the cassette can be executed by the existing capstan motor, the cost for providing the motors is eliminated, the horizontal and vertical movement device for the cassette, slider opening device, cassette take out device and the location detecting switch device and the like, are all very greatly simplified, whereby the number of parts employed is decreased, the part processing work and assembling work can be simplified, whereby there are the advantages that productivity is outstandingly increased, precise management of the products is easy due to the simplified structure and the operation of the mechanism thereof is smoother.

What is claimed is:

1. A cassette loading apparatus for a digital audio tape recorder, comprising:
   a main body;
   a cassette holder;
   a capstan motor mounted on said main body, and
   a switch for supplying power to said capstan motor, said switch being mounted to be activated, for supplying of power to said capstan motor, by contact with said cassette holder for controlling said capstan motor to move said cassette holder into said main body, said loading apparatus further comprising a lift and drop plate and an axle shaft connecting said lift and drop plate to said cassette holder, and a cam lever mounted on said main body, said cam lever being positioned to be activated by said capstan motor, when said cassette holder has been moved a predetermined distance horizontally into said main body, to move said lift and drop plate for moving said cassette holder downwardly into said main body to thereupon turn power to said capstan motor off.

2. The cassette loading apparatus of claim 1 further comprising an eject button connected to control said capstan motor to rotate in a direction opposite to which it rotates during a loading operation, for moving said cassette vertically and then horizontally out of said main body.

3. A cassette loading apparatus for digital audio tape recorder comprising:
 a main body having a base plate and parallel brackets affixed vertically to opposite sides of the base plate;
 a cassette tray having a door at a frontward end portion, a pair of side slide plates, and an intermediate supporting plate;
 a plurality of guide holes formed in said brackets and side slide plates;
 said side slide plates having a guide groove at an interior frontward portion thereof;
 a cassette holder for receiving a cassette, said holder having a pierced hole, release protrusion and hooking piece;
 a lift and drop plate connected by an axle shaft to said cassette holder;
 a pair of guide pins at sides of the cassette holder on the lift and drop plate for supporting the cassette tray, cassette holder and lift and drop plate, said guide pins being inserted into a first and second of said guide holes of said side brackets through the first and second guide holes of said side slide plates, said guide pins being mounted to guide the horizontal movement and the vertical movement of the cassette;
 a guide pin at said slide plates and inserted into the guide hole of said side brackets, and a guide pin is formed at a side surface of said cassette holder and inserted into said guide groove;
 a rack at a side slide plate of said cassette tray;
 a driving gear having a small gear and a large gear integral with said small gear, the small gear being meshed with said rack; and
 a turning plate having an axle shaft rotatably affixed thereto at a rear end portion of said side brackets and provided at both front end portions thereof with connecting grooves connected with connecting portion of said lift and drop plate, whereby during cassette loading, the cassette tray, cassette holder and lift and drop plate are moved horizontally by the rotation of the driving gear, and subsequently the cassette is moved vertically.

4. A cassette loading apparatus for a digital audio tape recorder according to claim 3, comprising
 a cassette take out protrusion formed integrally at the intermediate portion of the supporting plate of said cassette tray, the guide pin of the cassette holder being mounted to be caught by the right side end portion of the first guide hole of both side brackets and then stopped thereafter when unloading the cassette tray, the cassette tray having an overstroke when the cassette is taken out of the cassette holder.

* * * * *